United States Patent [19]

Gershenson et al.

[11] Patent Number: 5,075,004
[45] Date of Patent: Dec. 24, 1991

[54] FILTER BAG SEAL

[75] Inventors: Moshe Gershenson, Mohegan Lake, N.Y.; John Dragasevich, Scarborough, Canada; J. Michael Donahue, Oakland, N.J.

[73] Assignee: ISP Investments Inc., Wilmington, Del.

[21] Appl. No.: 601,536

[22] Filed: Oct. 23, 1990

[51] Int. Cl.⁵ .................. B01D 29/11; B01D 29/27
[52] U.S. Cl. .................. 210/445; 210/452; 210/453; 55/495
[58] Field of Search ............ 210/445, 448, 452, 453; 55/490, 495

[56] References Cited

U.S. PATENT DOCUMENTS

| | | | |
|---|---|---|---|
| 3,640,392 | 2/1972 | Smith et al. | 210/452 |
| 4,133,769 | 1/1979 | Morgan | 210/455 |
| 4,259,188 | 3/1981 | Morgan | 210/448 |
| 4,285,814 | 8/1981 | Morgan, Jr. | 210/452 |
| 4,490,253 | 12/1984 | Tafara | 210/452 |
| 4,948,504 | 8/1990 | Kierdorf et al. | 210/452 |
| 4,966,697 | 10/1990 | Rosaen | 210/452 |

Primary Examiner—Robert A. Dawson
Assistant Examiner—Wanda L. Millard
Attorney, Agent, or Firm—Richard T. Laughlin; Anthony Lagani, Jr.; Joshua J. Ward

[57] ABSTRACT

A filter apparatus having a bag filter subassembly for collecting contaminating material. The bag filter subassembly includes a bag filter having a top end portion and an integral collar. The collar has a lower portion fixedly connected to the bag filter, and has a middle portion to be supported within a vessel, and has a top lip portion to engage a cover plate of the vessel. The collar has a pivotal web portion disposed between the middle portion and the top lip portion, and has an inner surface with a groove having sidewalls, whereby internal pressure on the sidewalls pivot the top lip portion causing a sealing ring bearing area on the cover plate.

5 Claims, 2 Drawing Sheets

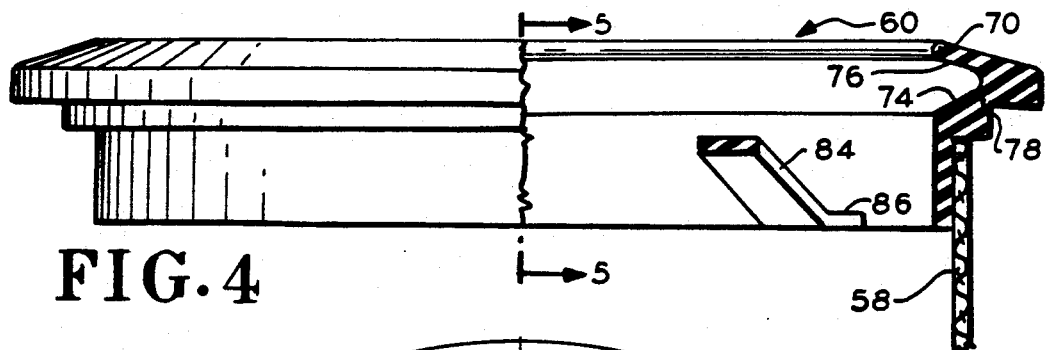
FIG. 4    FIG. 3
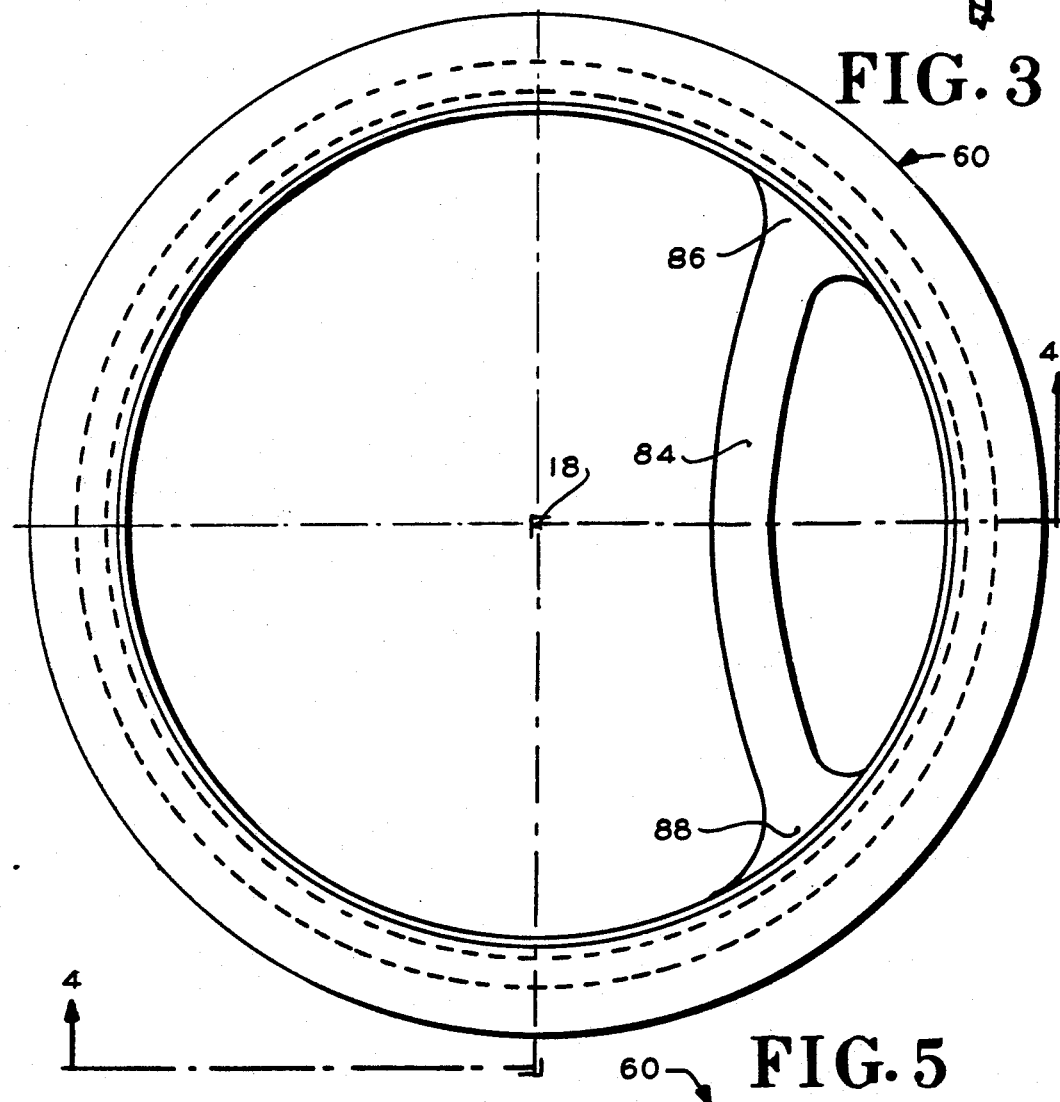
FIG. 5
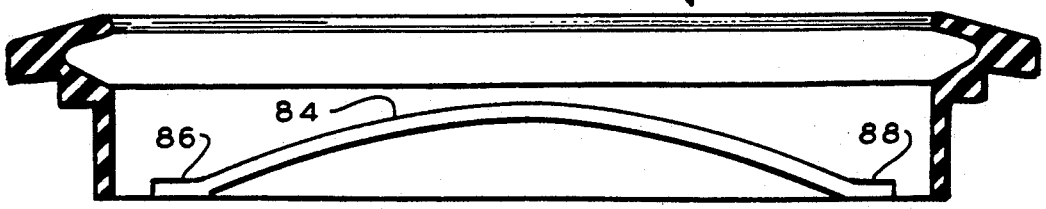

FILTER BAG SEAL

The invention relates to a filter bag seal and in particular the invention relates to a filter bag seal having a pivotal lip portion.

1. Related Application

A related application, which is assigned to the same assignee as this application, is Ser. No. 502,714 filed 04/02/90, now U.S. Pat. No. 5,039,410, in the name of Moshe Gershenson entitled "Filter Apparatus Having A Bag With A Gasket".

2. Background of the Invention

The prior art filter apparatus having a bag with a resilient gasket is described in U.S. Pat. No. 4,460,468, issued July 17, 1984. Related patents include U.S. Pat. Nos.:

3,771,664, issued Nov. 13, 1973,
4,133,769, issued Jan. 9, 1979,
4,204,966, issued May 27, 1980,
4,259,188, issued Mar. 31, 1981,
4,285,814, issued Aug. 25, 1981,
4,419,240, issued Dec. 6, 1983,
4,490,253, issued Dec. 25, 1984, and
4,669,167, issued June 2, 1987.

The prior art filter apparatus having a bag with a resilient gasket includes a housing, a cover plate, and a bag filter subassembly. The bag filter subassembly has a filter bag and a rubber seal member. The seal member has a web portion and a peripheral head portion for forming a seal between the housing and the cover plate, the rubber seal being attached to the bag filter at its open end by an adhesive or heat seal.

One problem with the prior art filter apparatus is that there is a gap between the seal member and the cover plate thereby causing a leakage past the seal member.

SUMMARY OF THE INVENTION

According to the present invention, a filter apparatus is provided The filter apparatus comprises an enclosure subassembly having a housing and a cover plate and a bag filter subassembly, the bag filter subassembly having a filter bag and a molded plastic collar, the collar having a lower portion attached to the filter bag and having a middle portion fixedly connected to the lower portion and having a top lip portion pivotally connected to the middle portion, the middle portion and top lip portion forming an inner groove, whereby internal housing pressure pivots the top lip portion engaging the top lip portion in sealing engagement with the cover plate.

By using the collar, the collar lip portion is urged against the cover plate with a sealing pressure which is in proportion to the housing internal pressure whereby leakage past the collar is minimized.

The foregoing and other objects, features and advantages will be apparent from the following description of the preferred embodiment of the invention as illustrated in the accompanying drawings.

BRIEF DESCRIPTION OF THE DRAWINGS

FIG. 3 is a plan section view as taken along the line 3—3 of FIG. 1;

FIG. 4 is a section view as taken along the line 4—4 of FIG. 3; and

FIG. 5 is a section view as taken along the line 5—5 of FIG. 4

DESCRIPTION OF THE PREFERRED EMBODIMENT

Figure 1:
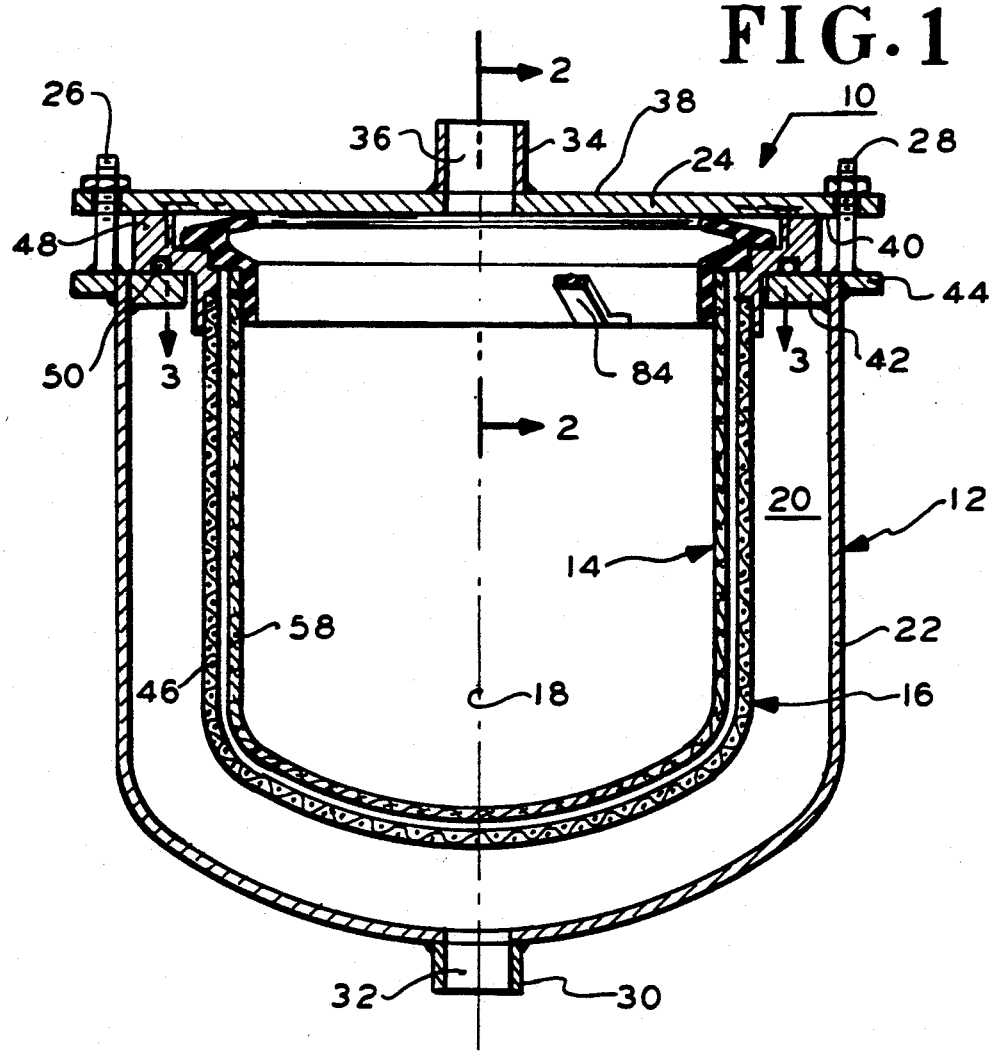
FIG. 1 is a vertical section view of a filter apparatus according to the invention.

As shown in FIG. 1 a pressure filtration apparatus 10 is provided. Apparatus 10 includes an enclosure subassembly 12, a basket subassembly 16, and a bag filter subassembly 14, which are coaxial about an axis 18. Enclosure subassembly 12 is a pressure vessel.

Enclosure subassembly 12, which encloses a chamber 20, has a housing 22, and a cover plate 24, which has a plurality of hold-down bolts 26,28 with nuts. Housing 22 also has an outlet pipe 30 with an outlet passage 32 from chamber 20. Cover plate 24 has an inlet pipe 34 with an inlet passage 36 to chamber 20. Cover plate 24 has an upper surface 38 and a lower surface 40.

Housing 22 also has an inner flange or support bracket 42, which supports basket subassembly 16, and has an outer flange 44, which supports bolts 26, 28.

Figure 2:
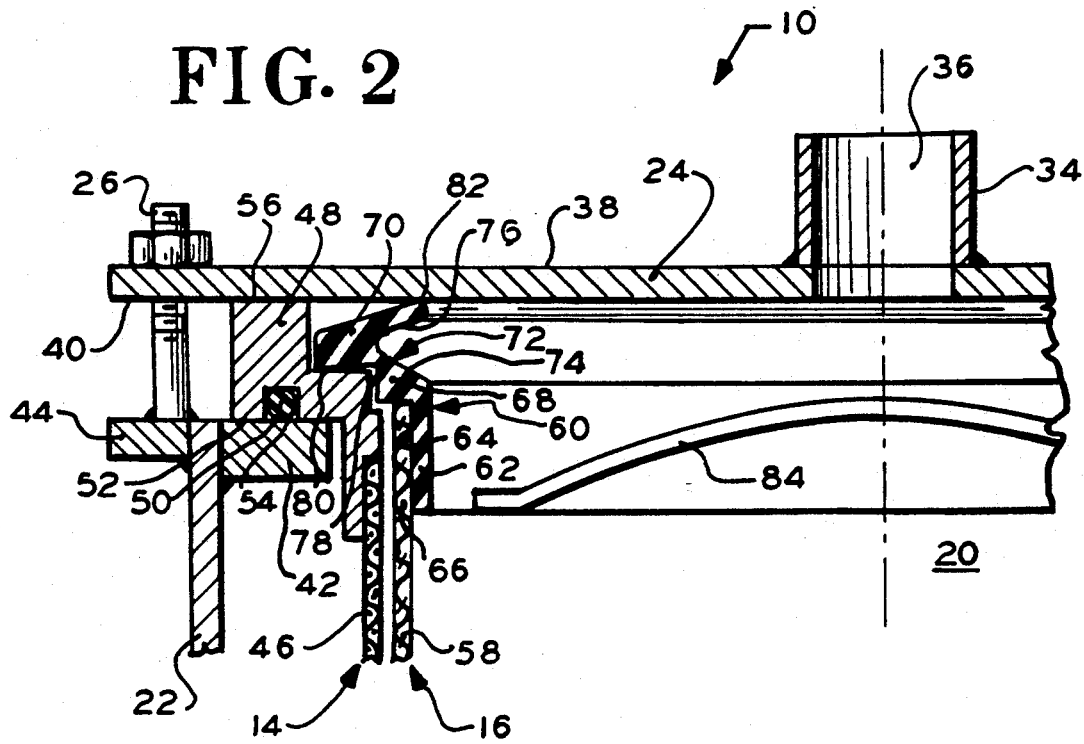
FIG. 2 is a portion of FIG. 1.

As shown in FIG. 2, basket subassembly 16 has a basket portion 46, and has an annular member 48, which has an O-ring 50 of rubber-like material. Annular member 48 has an underside surface 52, which has a groove 54 that receives O-ring 50. Annular member 48 is fixedly connected to and supports basket portion 46. Annular member 48 also has an upper bearing surface 56. Annular member 48 bears on O-ring 50, which bears on inner flange 42.

Filter subassembly 14 has a filter bag 58 and a seal ring or integral collar 60. Collar 60 is preferably made of a molded thermoplastic rubber manufactured by Monsanto. Collar 60 has a lower flange portion 62, which has a ring-shaped one-sided recess 64 that receives a top end portion 66 of filter bag 58. Collar 60 also has a middle portion 68 and a top lip portion 70. Bag 58 is attached to portion 62 by sewing stitches and/or by heat sealing. Middle portion 68 and top lip portion 70 together form a circumferential cavity or inner groove 72. Groove 72 has a slanted lower sidewall 74 and a slanted upper sidewall 76. Top lip portion 70 and middle portion 68 have a pivotal web portion, 78 therebetween, for pivoting of portion 70 relative to portion 68. Top lip portion 70 forms a bottom, ring-shaped sealing area 80 with portion 48, and forms a top ring-shaped sealing area 82 with cover plate 24, due to internal pressure forces on sidewalls 74, 76.

Collar 60 also has a handle 84 for lifting bag 58 from chamber 20. Handle 84 has flared end portions 86, 88, each of which is integrally molded with collar 60 and is connected to lower portion 62.

Collar 60 is retained between cover plate 24 and annular member 48. Liquid pressure inside bag 58 exerts a force on each of the sidewalls 74 and 76. Such forces flex lip portion 70 and cause the formation of a substantially leak-proof sealing between lip portion 70 and cover plate 24. A lever-type action about the web portion 78 causes a seal area 80 between the underside of lip portion to an annular member 48 and causes a seal area 82 between the top of lip portion 70 and cover plate 24. The higher the internal pressure, the higher is the sealing force exerted on cover plate 24 and on annular member 48. Thus the sealing by collar 60 is better than the sealing by the prior art seal member.

Handle 84 curves upwardly away from its end portions 86, 88. Handle 84 at the center portion, between end portions 86, 88, is relatively close to the top of collar 60, and near to top of basket member 48, so that handle 84 is not normally submerged in liquid. Thus, handle 84 facilitates removal of bag 58.

The advantages of filter apparatus 10 with its axially expandable collar 60 are indicated hereafter:

(A) Collar 60 substantially minimizes by-pass leakage of liquid past collar 60 between cover plate 24 and filter bag 58.

(B) Collar 60 and bag filter subassembly 14 are adaptable to basket subassemblies and enclosure subassemblies which are made by different manufacturers, and which have relatively slight variation in bag diameter and collar depth.

While the invention has been described in its preferred embodiment, it is to be understood that the words which have been used are words of description rather than limitation and that changes may be made within the purview of the appended claims without departing from the true scope and spirit of the invention in its broader aspects.

For example, a second handle, like handle 84, can be provided in a symmetrical arrangement for ease of lifting bag 58 from gasket portion 46.

What is claimed is:

1. A filter apparatus comprising:
   an enclosure subassembly having an axis and having a housing with a top flange and having a cover plate connected to the housing;
   a basket subassembly having a basket portion and having an annular ring in sealing engagement with the top flange;
   a bag filter subassembly having a filter bag and an integral collar in sealing engagement with the annular ring and with the cover plate;
   said collar having a lower portion fixedly connected to the filter bag and having a middle portion supported by the annular ring and having a top lip portion engaging the cover plate;
   said collar having an inner surface with an inner groove having a lower sidewall disposed adjacent to the middle portion and having an upper sidewall disposed adjacent to the top lip portion;
   said collar having a pivotal web portion disposed between the middle portion and the top lip portion;
   whereby forces normal to the groove sidewalls due to internal pressure within the bag filter subassembly pivots the top lip portion about the pivotal web portion causing a sealing ring area of the lip portion on the cover plate and causing a sealing ring area of the lip portion on the annular member.

2. The apparatus of claim 1 wherein
   the collar has at least one elongated handle and a radial inner face;
   the handle having opposite end portions, each end portion having an arcuate flexible connection to the radially arranged inner face;
   whereby an axial lifting force on handle is disposed parallel to and slightly offset from the filter bag tension force, for minimizing twisting of the gasket ring.

3. The apparatus of claim 1, wherein the collar is composed of a molded thermoplastic rubber.

4. A bag filter subassembly for an enclosure subassembly having a cover plate comprising;
   a filter bag having a top end portion of ring shape; and
   a collar having a lower portion fixedly connected to the bag top end portion and having a middle portion supported by the enclosure subassembly and having a top lip portion engaging the cover plate;
   said collar having an inner surface with an inner groove, said groove having a lower sidewall disposed adjacent to the middle portion and having an upper sidewall disposed adjacent to the top lip portion;
   said collar having a pivotal web portion disposed between the middle portion and the top lip portion;
   whereby forces normal to the groove sidewall due to internal pressure within the bag filter assembly pivots the top lip portion about the pivotal web portion causing a sealing ring area of the lip portion on the cover plate and causing a sealing ring area of the lip portion on the annular member.

5. A filter apparatus comprising:
   an enclosure subassembly having an axis and having a housing with a top flange and having a cover plate connected to the housing;
   a basket subassembly having a basket portion and having an annular ring in sealing engagement with the top flange; and
   a bag filter subassembly having a filter bag and a collar in sealing engagement with the annular ring and with the cover plate;
   said collar having at least one elongated hand and a radial inner face;
   said handle having opposite end portions, each end portion having an arcuate flexible connection to the radially arranged inner face;
   whereby an axial lifting force on handle is disposed parallel to and slightly offset from the filter bag tension force, for minimizing twisting of the gasket ring; and
   said collar having a lower portion fixedly connected to the filter bag and having a middle portion support by the annular ring and having a top lip portion engaging the cover plate;
   said collar having an inner surface with an inner groove having a lower sidewall disposed adjacent to the middle portion and having an upper sidewall disposed adjacent to the top lip portion;
   said collar having a pivotable web portion disposed between the middle portion and the top lip portion;
   whereby forces normal to the groove sidewalls due to internal pressure within the bag filter subassembly pivots the top lip portion about the pivotable web portion causing a sealing ring area of the lip portion on the cover plate and causing a sealing ring area of the lip portion on the annular member.

* * * * *